(12) United States Patent
Freeman et al.

(10) Patent No.: US 7,753,990 B2
(45) Date of Patent: *Jul. 13, 2010

(54) AERATED DEGASSER

(75) Inventors: Michael A. Freeman, Kingwood, TX (US); Eric Hand, Katy, TX (US)

(73) Assignee: M-I LLC, Houston, TX (US)

( * ) Notice: Subject to any disclaimer, the term of this patent is extended or adjusted under 35 U.S.C. 154(b) by 434 days.

This patent is subject to a terminal disclaimer.

(21) Appl. No.: 11/677,829

(22) Filed: Feb. 22, 2007

(65) Prior Publication Data

US 2007/0199703 A1 Aug. 30, 2007

Related U.S. Application Data

(60) Provisional application No. 60/776,372, filed on Feb. 24, 2006.

(51) Int. Cl.
*B01D 19/00* (2006.01)

(52) U.S. Cl. .................. 95/9; 95/261; 95/254; 95/245; 96/202; 96/208; 96/216

(58) Field of Classification Search .............. 95/261, 95/263, 254, 9, 245, 246; 96/202, 208–214, 96/216, 217, 183–186
See application file for complete search history.

(56) References Cited

U.S. PATENT DOCUMENTS 4,412,924 A * 11/1983 Feather ................. 210/744
4,715,869 A * 12/1987 Ramshaw ................ 95/263
4,923,614 A * 5/1990 Engelbart ................ 210/648

(Continued)

FOREIGN PATENT DOCUMENTS

SU 1431798 A1 10/1988

(Continued)

OTHER PUBLICATIONS

Notification of Transmittal of the International Search Report and The Written Opinion of the International Searching Authority, or the Declaration dated Sep. 4, 2007 for International Application No. PCT/US2007/004894, (3 pages).

(Continued)

*Primary Examiner*—Duane Smith
*Assistant Examiner*—Douglas J Theisen
(74) *Attorney, Agent, or Firm*—Osha • Liang LLP (57) ABSTRACT

The present invention provides a system for reducing entrained and dissolved gasses from a well fluid. The system includes a well fluid, at least one process tank into which the well fluid flows, wherein a first process tank comprises a weir arrangement over which the well fluid spills, a mechanical degasser coupled to the at least one process tank and configured to receive the well fluid, and an aeration device disposed in the at least one process tank that generates bubbles in the well fluid. The present invention also provides a method of reducing entrained and dissolved gases from a well fluid that includes flowing a well fluid into a process tank, exerting a centrifugal force on the well fluid, and generating bubbles in the well fluid in the process tank.

23 Claims, 8 Drawing Sheets

U.S. PATENT DOCUMENTS

| | | | |
|---|---|---|---|
| 5,290,487 A * | 3/1994 | Ludwig ................... | 261/122.1 |
| 5,516,360 A | 5/1996 | Normandeau et al. | |
| 5,525,242 A | 6/1996 | Kerecz | |
| 5,673,752 A | 10/1997 | Scudder et al. | |
| 5,928,519 A * | 7/1999 | Homan ...................... | 210/741 |
| 6,089,345 A | 7/2000 | Meynier et al. | |
| 6,143,709 A | 11/2000 | Carey | |
| 6,325,943 B1 | 12/2001 | Kohlenberg | |
| 6,709,500 B1 * | 3/2004 | West ........................... | 96/216 |
| 2006/0032375 A1 * | 2/2006 | Verscharen .................. | 95/263 |

FOREIGN PATENT DOCUMENTS

| | | | |
|---|---|---|---|
| SU | 1634295 A1 | 3/1991 | |
| WO | WO 2007105086 A1 * | 9/2007 | |

OTHER PUBLICATIONS

Written Opinion of the International Searching Authority dated Sep. 4, 2007 for International Application No. PCT/US2007/004894, (4 pages).

International Search Report dated Sep. 4, 2007 for International Application No. PCT/US2007/004894, (3 pages).

Official Action with English translation for related Eurasian Patent Application No. 200870293; dated Oct. 13, 2009 (3 pages).

* cited by examiner

AERATED DEGASSER

CROSS-REFERENCE TO RELATED APPLICATIONS

This application, pursuant to 35 U.S.C. §119(e), claims priority to U.S. Provisional Application Ser. No. 60/776,372, filed on Feb. 24, 2006. That application is incorporated by reference in its entirety.

BACKGROUND OF INVENTION

1. Field of the Invention

The invention relates generally to a system for treating well fluids.

2. Background Art

When drilling or completing wells in earth formations, various fluids typically are used in the well for a variety of reasons. Common uses for well fluids include: lubrication and cooling of drill bit cutting surfaces while drilling generally or drilling-in (i.e., drilling in a targeted petroleum bearing formation), transportation of "cuttings" (pieces of formation dislodged by the cutting action of the teeth on a drill bit) to the surface, controlling formation fluid pressure to prevent blowouts, maintaining well stability, suspending solids in the well, minimizing fluid loss into and stabilizing the formation through which the well is being drilled, fracturing the formation in the vicinity of the well, displacing the fluid within the well with another fluid, cleaning the well, testing the well, implacing a packer fluid, abandoning the well or preparing the well for abandonment, and otherwise treating the well or the formation.

In drilling some subterranean formations, and particularly those bearing oil or gas, hydrogen sulfide accumulations are frequently encountered. The circulation of well fluid brings the hydrogen sulfide from the formation to the surface. Such sulfide in the well fluid is problematic, as it can corrode the steel in the drilling apparatus and may be liberated into the atmosphere as toxic sulfide gas at the well surface. Further, hydrogen sulfide contaminated oil from the well fluid may become associated with or absorbed to the surfaces of the cuttings that are removed from the formation being drilled. The cuttings are then an environmentally hazardous material, making disposal a problem.

Generally, to protect the health of those working with the well fluid and those at the surface of the well, conditions should be maintained to ensure that the concentration of hydrogen sulfide released from the fluid, emitted due to the partial pressure of the gas, is less than about 15 ppm. The partial pressure of hydrogen sulfide at ambient temperatures is a function of the concentration of sulfide ions in the fluid and the pH of the fluid. To ensure that the limit of 15 ppm is not exceeded even for the maximum sulfide concentration that may be encountered in a subterranean formation, the pH of the well fluid is typically maintained at a minimum of about 11.5. Also, to prevent the soluble sulfide concentration in the well fluid from becoming excessive, action is routinely taken to remove sulfide from the well fluid.

Dissolved gases cause many problems in the oil field. Gases and other fluids present in subterranean formations, collectively called reservoir fluids, are prone to enter a wellbore drilled through the formation. In many cases, dense drilling fluids, completion brines, fracturing fluids, and so forth are provided to maintain a countering pressure that restrains the reservoir fluids from entering the wellbore. However, there are many instances where the counter pressure is too low to restrain the reservoir fluids. This may be due to, for example, a miscalculation of the fluid density needed to maintain a hydrostatic overbalance or a transient lowering of pressure due to movement of the drill string in the hole. Gasses may also enter the wellbore through molecular diffusion if there is insufficient flux of fluid from the wellbore to keep it swept away. Finally, reservoir fluids escape from the fragments of the formation that are being drilled up. The reservoir fluid that enters the well is then free to mix with the supplied well fluid and rise to the surface.

The hazards of unrestrained expansions of reservoir fluids in the wellbore are well known. A primary hazard is an avalanche effect of gas evolution and expansion, wherein gas bubbles rise in a liquid stream, expanding as they rise. As the bubbles expand, they expel dense fluid from the bore, and further reduce the hydrostatic pressure of the wellbore fluid. Such a progression may eventually lead to a 'blow out,' whereby so much restraining pressure has been lost that the high pressure reservoir can flow uncontrollably into the wellbore.

Less dramatic, but equally important, are chemical effects that formation fluids may have upon the circulating fluid, the structure of the well, and the associated personnel. These effects and risks may include, for example: methane gas liberated at the surface may ignite; carbon dioxide may become carbonic acid, a highly corrosive compound, when exposed to water; carbon dioxide gas is an asphyxiant; hydrogen sulfide can corrode ferrous metals, particularly in contact with water, and is more damaging than carbon dioxide because it can induce hydrogen embrittlement; embrittled tubulars may separate or break well under design stresses with catastrophic consequences; hydrogen sulfide gas is also toxic, with levels of 800 to 1000 ppm causing death in healthy individuals. Removing dissolved and entrained gases is thus vital to many aspects of successful drilling and exploitation.

Chemical processes have been previously used to ameliorate the effects of dissolved gasses, particularly of hydrogen sulfide and carbon dioxide. Caustic and similar high-pH materials, for example, sodium hydroxide, are added to circulating well fluid to maintain pH. Copper, zinc, and iron compounds have been added to react with and sequester hydrogen sulfide, although they often have deleterious effects on circulating fluid properties and can cause environmental disposal issues. Oxidants, such as hypochlorite, have also been proposed, but they may have destructive effects on organic and metal components.

Accordingly, there exists a need for a method and apparatus to facilitate the removal of entrained and dissolved gases in a well fluid. Further, there exists a need for a method and apparatus to facilitate the destruction and removal of hydrogen sulfide in a well fluid.

SUMMARY OF INVENTION

In one aspect, the invention relates to a system for reducing entrained and dissolved gases from a well fluid including a well fluid, at least one process tank into which the well fluid flows, wherein a first process tank comprises a weir arrangement over which the well fluid spills, a mechanical degasser coupled to the at least one process tank and configured to receive the well fluid, and an aeration device disposed in the at least one process tank that generates bubbles in the well fluid.

In another aspect, the invention relates to a method of reducing entrained and dissolved gases from a well fluid, the method including flowing a well fluid into a process tank, exerting a centrifugal force on the well fluid, and generating bubbles in the well fluid in the process tank.

In another aspect, the invention relates to a system for reducing entrained and dissolved gases from a well fluid including a well fluid, at least one process tank into which the well fluid flows, wherein a first process tank comprises a weir arrangement over which the well fluid spills, a mechanical degasser coupled to the at least one process tank and configured to receive the well fluid, and means for generating bubbles in the well fluid.

Other aspects and advantages of the invention will be apparent from the following description and the appended claims.

DETAILED DESCRIPTION

In one aspect, embodiments of the invention are directed to a novel system and method for removing entrained and/or dissolved gases from a well fluid. In another aspect, embodiments of the invention are directed to a novel system and method for removing hydrogen sulfide, $H_2S$, from well fluids. Embodiments of the invention include both physically removing the entrained and/or dissolved gas for flaring and chemical conversion of the gas into non-toxic, non-corrosive forms. Embodiments of the invention include removal or destruction of $H_2S$ through at least three processes, including partition of the $H_2S$ between gas and liquid phases, acid/base equilibria between dissolved sulfide species, and electrochemical equilibria between dissolved $H_2S$, oxygen ($O_2$), sulfur (S), and water ($H_2O$). Embodiments of the present invention involve degassing and aeration apparatuses. Exemplary apparatuses are described below.

Degasser

Degassers assist in maintaining a circulating fluid density so as to maintain needed hydrostatic pressure of the well fluid. A degasser applies a vacuum to a fluid and subjects the fluid to centripetal acceleration. The fluid is then sprayed against a surface, thereby removing entrained air and slowly-evolving bubbles of dissolved formation gases from the circulating fluid before its return downhole or before the fluids disposal.

Thus, in certain embodiments a mechanical degasser, for example, a MI SWACO® CD-1400, available from M-I, LLC (Houston, Tex.) may be coupled to a process tank. The well fluid passes through the mechanical degasser wherein centrifugal force is exerted on the well fluid. The centrifugal force of the mechanical degasser multiplies the force acting on the entrained gas bubbles, for example, hydrogen sulfide, to increase buoyancy of the gas bubbles, thereby releasing the entrained gas bubbles from the well fluid. The increase in buoyancy of the gas bubbles accelerates the bubble-rise velocity. As the bubbles rise toward the surface, they escape the well fluid. One of ordinary skill in the art will appreciate that any device known in the art that will exert a centrifugal force on the fluid may be used in place of a mechanical degasser.

Aeration

Sparging air through liquids strips both super-saturated and sub-saturated dissolved gases by carrying them out of the liquid. If the dissolved gas is not present in the gas used to sparge, the partial pressure of the dissolved gas is accordingly zero. Thus, the dissolved gases partition into the introduced, or sparged, gas bubble. With sparging at a constant rate under conditions of vapor/dissolved gas equilibrium, the reduction of dissolved gas proceeds exponentially, limited only by the total volume of sparge gas. The volume of dissolved gas removed from the fluid, in many instances, is limited by the rate in which the sparge gas bubbles can rise through the fluid and emerge. Attempts to pump high volumes of sparge gas become frustrated as the bubble content increases, because the viscosity of the bubble/liquid system increases, thereby hindering the rise of bubbles.

The rate of oxygen transfer across the air/fluid interface can only be determined empirically. For a fixed volume of air sparged through a fluid, mass transfer of gases into and out of the fluid is be a strong function of the surface area at the air/gas interface. Further, the more time each bubble resides in the liquid, the more complete the exchange. The Stokes-Einstein equation shows that residence time is primarily a function of the bubble diameter, gross density of the media, and system viscosity. The Stokes-Einstein equation may be written $D=kT/f$ where $D$ is the diffusion coefficient, $k$ is the Boltzmann constant, $T$ is the absolute temperature, and $f$ is the frictional coefficient, wherein $f=6\pi a\eta$, where $a$ is the radius of a particle and $\eta$ is the viscosity of a solvent. Small bubbles have larger surface area per volume and rise more slowly as compared to larger bubbles. Additionally, at higher concentrations, small bubbles will viscosify a fluid. Accordingly, a high volume fraction of small bubbles will provide greater reaction with hydrogen sulfide than a low volume fraction of large bubbles. "Small" and "large", as used herein with reference to the bubble, are relative to the rate at which the bubbles rise in a given system under a given set of conditions including rate of air injection, temperature, fluid viscosity, etc.

Bubbles may be generated by any method known in the art. For example, bubbles may be generated by an aeration device. In one embodiment the aeration device may include a septum or membrane configured with small perforations through which air may be released. In one embodiment, the membrane may be flexible, such as a woven or non-woven fabric, or a sheet of rubber or other elastomer with perforated openings cast or otherwise formed there-through. Alternatively, the membrane may be rigid, for example a solid frit, which is a body of sintered particles with fine openings between particles, or a metal surface with fine perforations, or openings devised by any means known in the art. Examples of such commercially available porous septa and perforated media are given in, for example, Chapter 18 of Perry's Chemical Engineers' Handbook, $6^{th}$ ed (1984). Further, bubbles may be created by passing gas through a surface free of openings, such as permeating hydrogen through a palladium film, at a lower flux. One of ordinary skill in the art will appreciate, however, that the membrane may be constructed of any of a number of materials known in the art, for example, glass, metal, plastic, etc., such that air may be sparged into the fluid. Bubbles may also be generated through direct mechanical means, wherein air is entrained in a well fluid by mixing. Further, bubbles may be generated through chemical means by various reactions known in the art that may convert solid or liquid components into gases.

In another embodiment, bubbles may be generated through destabilizing a gas-liquid solution. Bubbles may spontaneously form when the pressure or temperature of a liquid is changed from a previous state of gas/liquid saturation. Commercially, Dissolved Air Flotation (DAF) saturates water with air at higher applied pressure, for example, 100 psi, and then reduces the pressure of the system. The water may then be allowed to flow from a closed pressured conduit or vessel into a large vessel open to the atmosphere. Several commercial devices and processes for generating bubbles by destabilizing a gas-liquid solution are cited in Perry's Chemical Engineers' Handbook, $6^{th}$ ed (1984).

Figure 1:
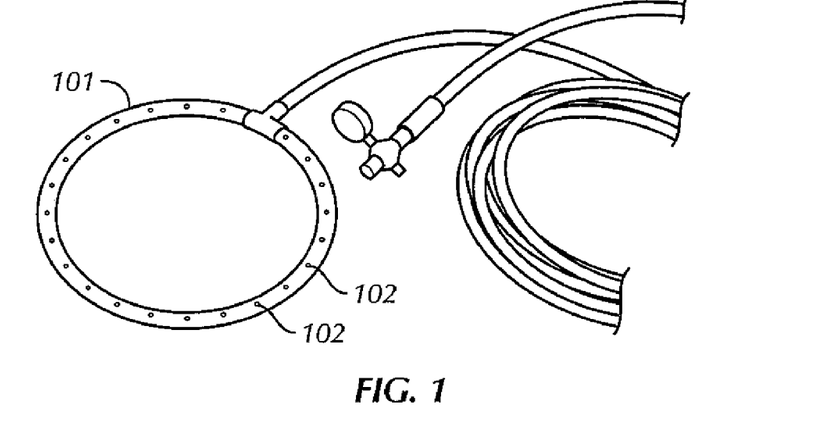
FIG. 1 shows a hose configuration in accordance with an embodiment of the invention.
Figure 2:
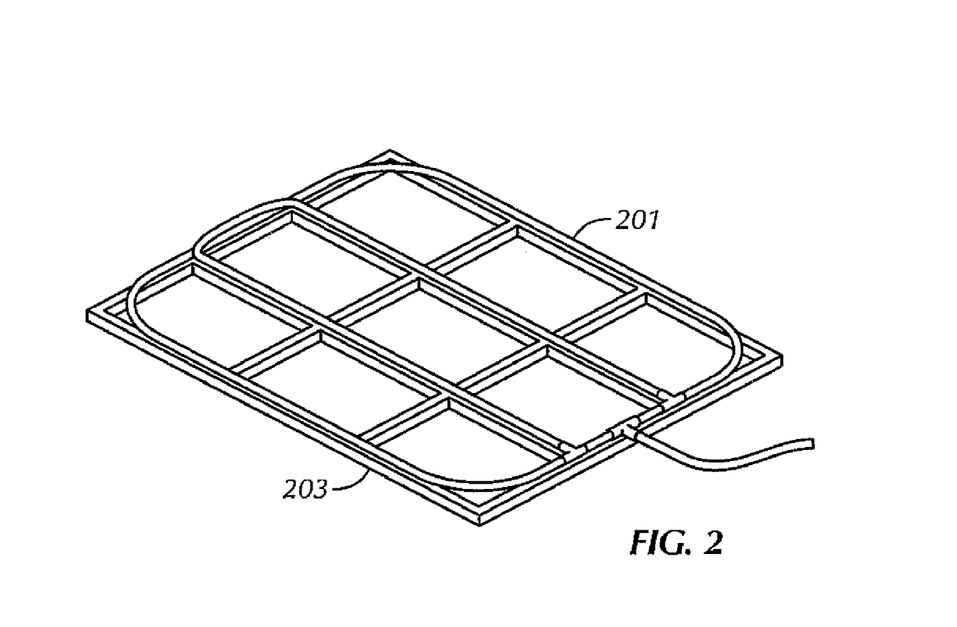
FIG. 2 shows a hose configuration in accordance with an embodiment of the invention.

In one embodiment, bubbles may be generated proximate an intake of a degasser. In one embodiment, a flexible, porous hose may sparge air into a fluid. The flexible, porous hose may be attached to weighted frames by any method known in the art, for example, by plastic ties or wire wrap. The hose may be fashioned into any shape using standard hose fittings. In one embodiment, the hose may be disposed proximate the intake of a degasser. FIG. 1 shows an example of a hose 101 configured with small perforations 102 to introduce bubbles proximate the intake of a degasser. While the circular hose 101 of FIG. 1 provides short air/water contact times, it minimizes the opportunities for foaming, thereby reducing the risks involved in introducing air into a fluid. In another embodiment, shown in FIG. 2, a more aggressive air injection may be provided using a bubbler pattern that covers the entire base of the process tank. A hose 201 may be secured to a weighted frame 203. Such an arrangement provides more linear feet of the hose, or bubbler, and many more bubbles for a given process tank. For a hose that covers the entire base of a tank, many of the bubbles generated may be outside the immediate draw of the degasser. In this embodiment, the degasser used must be effective to reduce foaming.

In order to maintain the integrity of the porous hose and the proper bubble size, a proper range of air bubbles introduced into the fluid may be determined by measuring flow rate of the air as a function of hose length and applied pressure, as shown in the Examples below.

To determine the bubble size and volume fraction of bubbles, empirical testing was done using an open, rectangular tank with a degasser unit, for example, MI SWACO® CD-1400, mounted in the process tank. In this test, the process tank was filled with potable water to within 17 and ⅝ inches of the top, that is 1700 gal (6.4 m³) of water. A circular hose, shown in FIG. 1, introduced bubbles at the base of the degasser.

Figure 3:
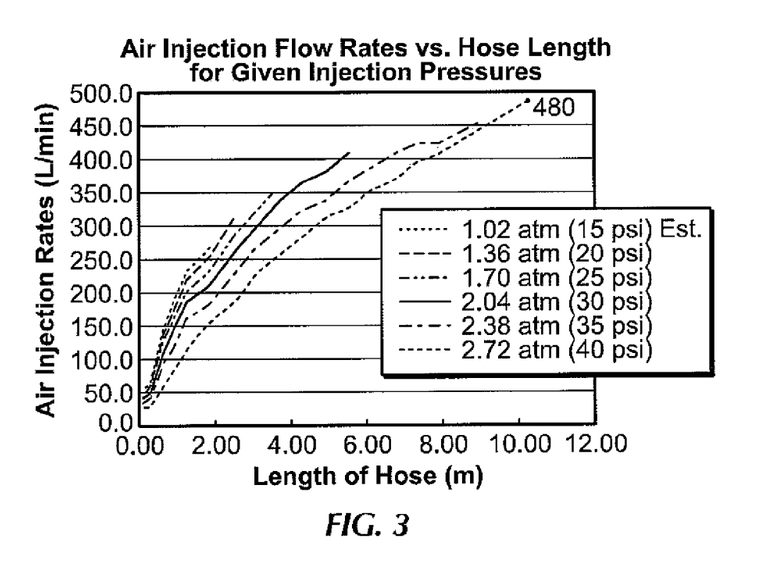
FIG. 3 shows a chart of air injection rates against length of time in accordance with an embodiment of the invention.

FIG. 3 shows the resulting air injection rates achievable for varied lengths of soaker hose for a range of injection pressures. Fine bubble generation was limited to injection pressures of 25 psi or lower. For shorter hose lengths, the air injection rate was limited due to over-pressuring of the hose. Accordingly, longer lengths of tubing are required to achieve high flow rates at low injection pressures. Thus, in this embodiment, approximately 50 L/min of air per meter of hose is required to retain fine bubble generation.

Thermodynamic Considerations

Partition of the $H_2S$ between gas and liquid phases is a kinetic process that approaches a thermodynamic equilibrium described by Henry's Law:

$$Y_i = H \chi_i \qquad (1)$$

where $Y_i$ is the partial pressure of species i over a solution, $\chi_i$ is mole-fraction of i in the solution, and H is a constant, appropriately called the Henry's law constant, unique to each species i. For $H_2S$, H has a value of $8.56 \times 10^{-3}$ atm·m³/mol at 20° C. This relation applies to air and water in the degassing system strictly when the two phases are allowed to stand long enough in contact for all portions of the gas and liquid to come into equilibrium. For example, if pure water were allowed to stand in a atmosphere of pure $H_2S$, the equilibrium concentration of dissolved $H_2S$ would be 3740 mg/L.

Figure 4:
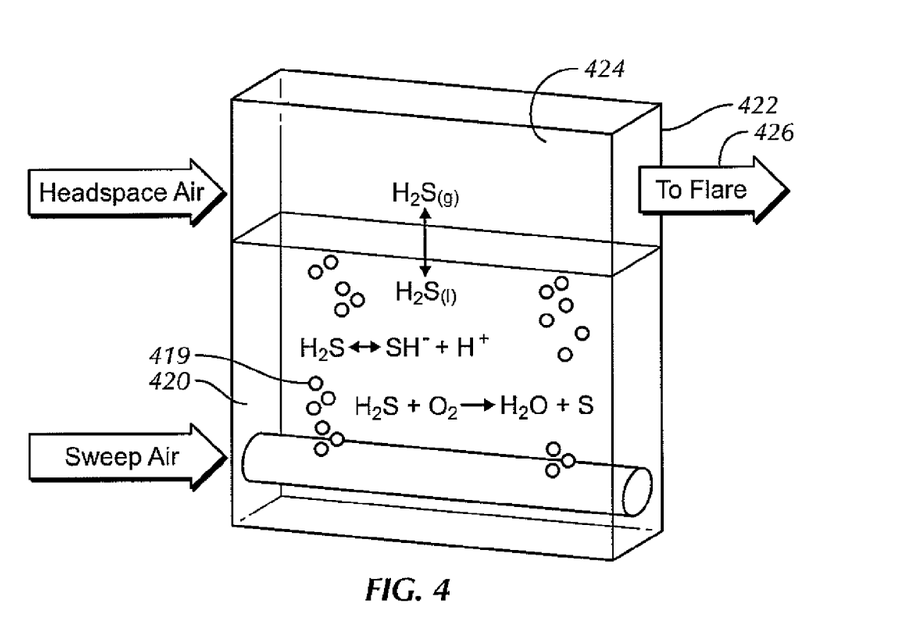
FIG. 4 shows a system diagram in accordance with an embodiment of the invention.

In one embodiment, as shown in FIG. 4, air bubbles 419 are injected into a well fluid 420 contained in process tank 422. Entrained gases, for example hydrogen sulfide, may escape and fill the headspace volume 424. The gases that fill the headspace volume 424 are sent to flare 426.

In one embodiment, water containing dissolved $H_2S$ may flow into a process tank with the following system limitations. The equilibrium concentration of $H_2S$ in the air space of the process tank may be determined as described below. In one example, a process tank may have a total volume of 8,000 L and may be loaded with 6,000 L of water containing 1,000 mg/l of $H_2S$. This leaves 2,000 L of vapor space. The air in the vapor space may be void of oxygen (for reasons discussed later). In this example, the pH is kept stable at 2.0 even as $H_2S$ leaves the fluid. The following table summarizes the initial conditions of the system.

TABLE 1

| | |
|---|---|
| $H_2S$ in Water (mg/L) | 1000 |
| $H_2S$ in Air (ppm by volume) | 0 |
| Volume of static air (L) | 2,000 |
| Volume of static water (L) | 6,000 |
| pH | 2.0 |

The 6,000 L of water contains (1,000 mg/L×6,000 L×1 g/1000 mg×1 kg/1,000 g) 6 kg of $H_2S$. The molecular weight of $H_2S$ is approximately 34 g/mol, so there are (6 kg×1000 g/kg×1 mol/34 g) 176.47 mol of $H_2S$ in the water.

Neglecting the very small amount of water displaced by the gas, the mole fraction of $H_2S$ may be calculated as (moles $H_2S$)/(moles water). One liter of water weighs nearly 1 kg, and the molecular weight of water is 18 g/mol. Thus, there are (1 kg×1000 g/kg×1 mol/18 g) 55 mol/L of water. The number of moles of water can be determined by multiplying the total volume of static water by the fraction of mol/L of water (55 mol/L×6000 L) to yield 330,000 mol of water. Accordingly, the mole fraction of $H_2S$ is approximately (176.47/330,000) 0.000535.

The air space is initially free of $H_2S$, and to fill it requires that $H_2S$ leave the liquid. This reduces the mole fraction, thereby reducing the calculated equilibrium. To solve, consider the mass balance:

$$S_T = S_A + S_L \qquad (2)$$

where $S_T$ is the total sulfur in the unit, in this case 176.5 moles (from above), $S_A$ is the moles air space sulfur, and $S_L$ is moles liquid phase sulfur. Accordingly, the moles air space sulfur can be written as:

$$S_A = S_T - S_L = 176.5 - S_L \qquad (3)$$

To convert the moles air space sulfur, $S_A$, to a mole fraction gas, the ideal gas law may be used to first determine the volume of $H_2S$ gas. Assuming a constant temperature of 25° C., the ideal gas law may be expressed as (PV=nRT, RT is constant) 22.4 (L*atm/mol)*n=PV, where n is the number of moles, P is the pressure, and V is the volume.

Volume $H_2S$*$Y_i$=$S_A$×22.4 L*atm/mol;

Next, dividing by total volume to get the partial pressure:

$Y_i$=$S_A$×22.4 L*atm/mol/6,000 L

Substituting for $S_A$, $Y_i$=(176.5−$S_L$)×22.4 L*atm/mol/6,000 L

As above, the mole fraction in the liquid is:

$\chi_i$=$S_L$$H_2S$/330,000 mol water

Now, substituting for the variables in Henry's Law:

$Y_i$=H$\chi_i$ (176.5−$S_L$)×22.4 (L*atm/mol)/6,000 L=8.56×10⁻³ (atm*m³/mol)×1000 (L/m³)×$S_L$/330,000 mol Solving for the moles of liquid phase sulfur, $S_L$=175.68 mol.

And then plugging the value of $S_L$ into Equation 3, gives $S_A$:

$S_A$=(176.5−175.2)=1.3 mol

From the above, it is apparent that putting the fluid into a process tank and letting the $H_2S$ escape does very little to reduce the $H_2S$ content in the fluid. If the system is to be effective, there must be a much larger volume of gas into which the $H_2S$ can escape. Because the process tank size is fixed, and cannot be pressured, volume of gas into which the $H_2S$ can escape may only be increased by passing gas through the process tank.

Acid/Base Equilibria

The importance of maintaining the pH of the fluid and the determination of a pH threshold for effective stripping of hydrogen sulfide from the well fluid is illustrated below.

Hydrogen sulfide is an acid with two equivalents per mole, sequentially ionizing:

and

Hydrogen sulfide is a mild acid as shown by its acidity constants:

$$K_1 = \frac{[H^+][HS^-]}{[H_2S]} \quad K_1 = 1.039 \times 10^{-07}$$

$$K_2 = \frac{[H^+][S^{-2}]}{[HS^-]} \quad K_2 = 6.43 \times 10^{-16}$$

Figure 5:
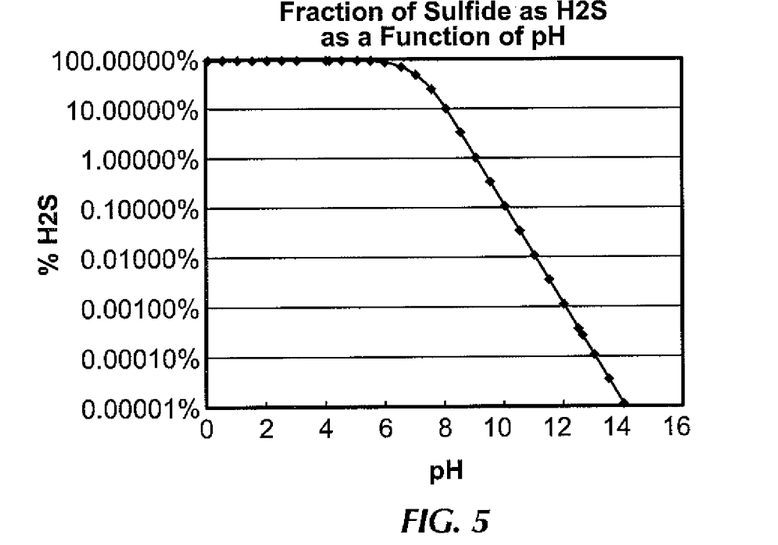
FIG. 5 shows a chart of amount of hydrogen sulfide reduced with respect to pH in accordance with an embodiment of the invention.

The second ionization constant is relatively low or weak such that $S^{-2}$ is virtually non-existent in dilute aqueous systems. Henry's law (shown in Equation 1) holds only when there is no chemical reaction between the solute and solvent. Accordingly, the pH of the well fluid affects the hydrogen sulfide ionization and the $H_2S$ concentration. Thus, the liquid/gas equilibria of $H_2S$ is partially dependent on the ionization of the hydrogen sulfide. Sulfide in the form of $HS^-$ is not volatile. As shown in FIG. 5, as the pH falls below 6, the sulfide in the well fluid is more likely to be in the non-volatile, $HS^-$, form. In one embodiment, a buffer may be added to the fluid to maintain a pH of less than 6. For example, citric acid may be provided to hold the pH at 4.

Electrochemical Equilibria

In one embodiment, oxygen is sparged into the well fluid to remove hydrogen sulfide from the well fluid. Oxygen in the sparged air, generally a nuisance to well fluids in the wellbore because of its corrosive nature, can be beneficial in sparging operations of general fluids. Hydrogen sulfide reacts with oxygen to become relatively harmless elemental sulfur. U.S. Pat. No. 5,525,242 issued to Kerecz and U.S. Pat. No. 6,325,943 issued to Kohlenberg describe methods of removing hydrogen sulfide by sparging with air, and are hereby incorporated by reference. Additionally, the removal of air may be facilitated by dispersing the water as a mist or inducing a vortex.

While nitrogen may be used in sparging processes, oxygen is a more effective sparging agent for scavenging hydrogen sulfide, because oxygen readily reacts with hydrogen sulfide. The thermodynamic drive to convert elemental oxygen into water by reacting with hydrogen sulfide to form elemental sulfur results in very low residual hydrogen sulfide. The kinetics of oxygen transfer across the gas/liquid interface may be a limiting factor; however, by using small bubbles rather than larger bubbles (as discussed below), this process may become more effective. The determination of how large a contribution oxygen makes to the removal of hydrogen sulfide in the well fluid is detailed below.

Air oxidation takes place via the reaction:

$$2H_2S + O_2 \rightarrow 2S + 2H_2O \qquad (4)$$

A one-sided arrow is used to indicate the reaction goes in only one direction, because the equilibrium between the products and reactants is very large. The equilibrium is written:

$$K_{eq} = \frac{[S^0][H_2O]}{[H_2S][O_2]}$$

The value of K may be determined by the Nernst equation:

$$E = E^0 - \frac{RT}{nF} \log\left(\frac{[S^0][H_2O]}{[H_2S][O_2]}\right) \qquad (5)$$

where E is the maximum potential difference, or electromotive force, R is the thermodynamic gas constant, T is the absolute temperature, F is Faraday's constant, and n is the number of electrons. At 25° C., 0.0592 V may replace RT/F in Equation 5 above.

The overall reaction may be written as:

$$O_2(g)+4H^++2S^{-2} \rightarrow 2H_2O \quad (6)$$

The half-cell reactions and corresponding oxidation potentials of the oxidation reaction shown in Equation 6 are:

$$O2(g)+4H^++4e^- \rightarrow 2H_2O \; E^0=1.229 \; V$$

$$S+2H^++2e^- \rightarrow H_2S \; E^0=0.142 \; V$$

Therefore, the potential of the overall reaction is (1.229−0.142) 1.077. The number of electrons, n, is 4. Plugging these values back into the Nerust Equation (Equation 5) yields:

$$\text{Log}_{10} K=4 \times 1.077/0.0592 \approx 72 \; K \approx 10^{72}$$

Accordingly, essentially all of the oxygen is consumed with concomitant destruction of hydrogen sulfide.

Process Overview

Figure 6:
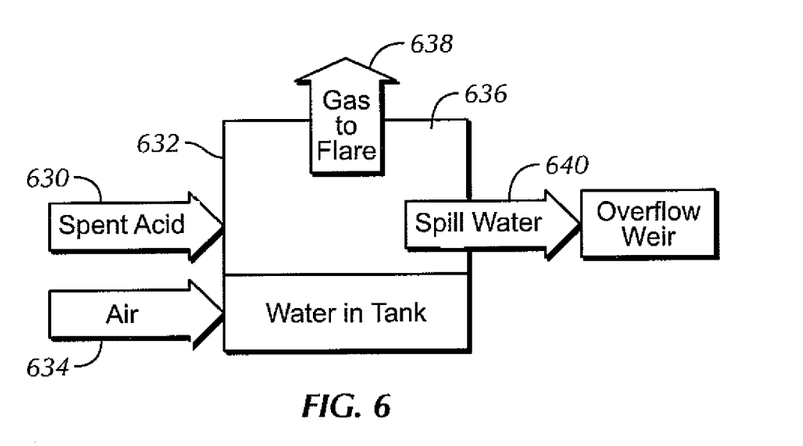
FIG. 6 shows a system diagram in accordance with an embodiment of the invention.

In one embodiment, a system for removing hydrogen sulfide is shown in FIG. 6. $H_2S$ enters the system as soluble sulfides with well fluid 630 as it is flowed into process tank 632. The well fluid 630 pours into the process tank until it reaches a pre-selected depth corresponding to a pre-selected volume. For example, in one embodiment, the pre-selected depth corresponds to a volume of 6 m³ of contained well fluid. Air 634 is sparged into the fluid 630. A mechanical degasser (not shown) coupled to the process tank 632 exerts a centrifugal force on the well fluid 630 to facilitate the escape of entrained gases into headspace volume 636. The removed entrained gases are sent to flare 638 for burning. As the well fluid 630 level in the process tank 632 rises above the pre-selected depth of contained well fluid due to the input flow of well fluid and the sparged air 634, the contained well fluid 630 spills over a weir arrangement, as spill water 640, in the process tank into a separate compartment.

Figure 7:
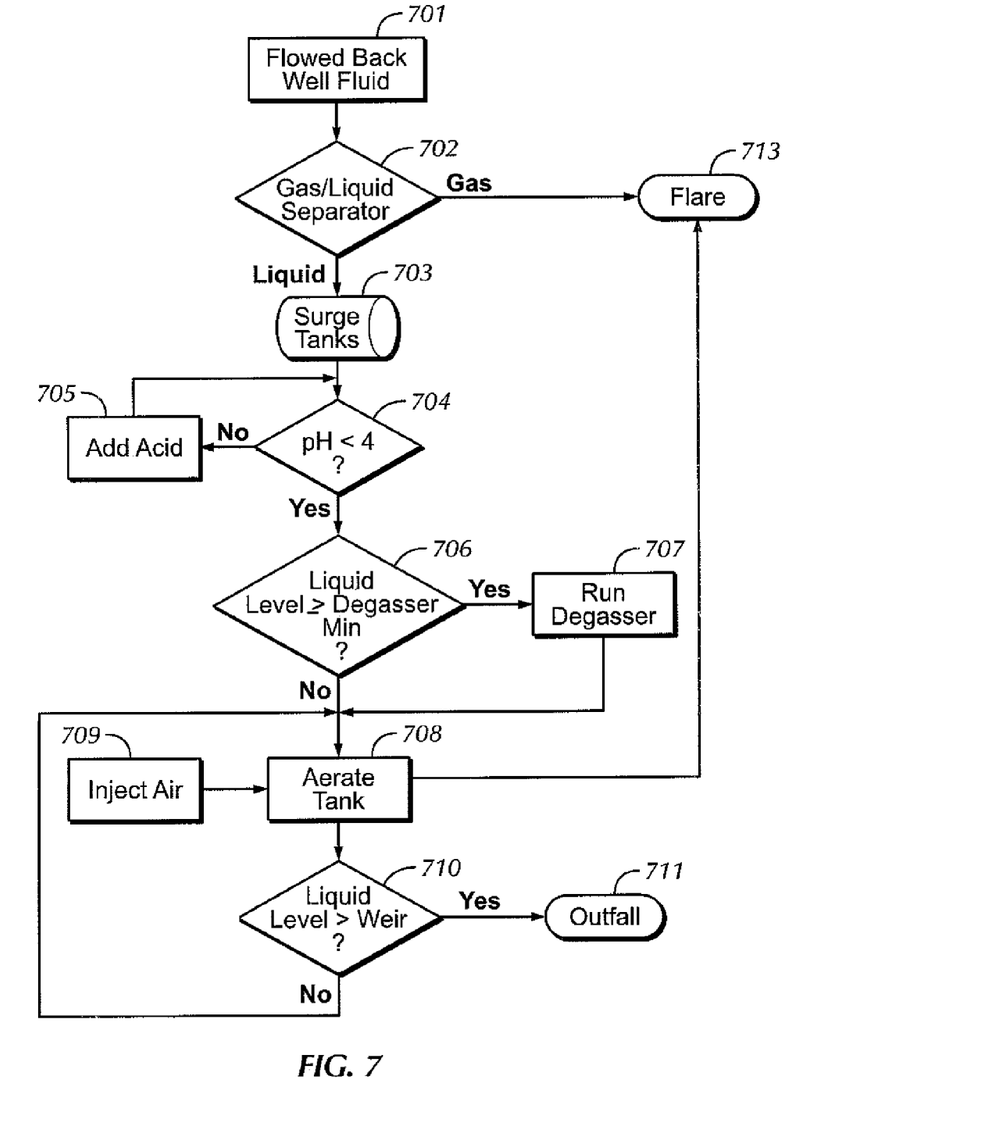
FIG. 7 shows a flow diagram of a degassing system in accordance with an embodiment of the invention.

In one embodiment, as shown in FIG. 7, a mobile degassing system is provided to remove entrained and/or dissolved gases from a well fluid. In this embodiment, a well fluid, for example, a spent acid, is flowed back 701 from the well. The well fluid undergoes a gross gas/liquid separation 702 in a unit upstream from the system, with the gases sent to a flare 713. At least one surge tank 703 regulates the flow of the well fluid before the well fluid enters a process tank containing at least one weir. The pH of the well fluid in the process tank is measured at 704. The pH of the well fluid may be measured by any method known in the art, and is not limited herein. If the well fluid has a pH greater than 4, then acid is added, shown at 705, to the well fluid until a pH of less than 4 is reached. In one embodiment, the acid added to the well fluid to maintain a pH of 4 may be citric acid. One of ordinary skill in the art will appreciate that other acids may be used to lower and maintain the pH of the well fluid.

If the pH of the well fluid is less than 4, then the level of fluid in the process tank is measured, shown at 706. One of ordinary skill in the art will appreciate that the level of fluid in the process tank may be measured by any method known in the art, for example, electronically by a sensor or manually by a system operator. Once the liquid level has reached a predetermined value required for running a degasser, the degasser is turned on, shown at 707.

In one embodiment, the well fluid is aerated 708 by injecting or sparging air 709 through the fluid in the process tank. In one embodiment, the fluid sparged through the well fluid is oxygen. In one embodiment, the mechanical degasser and sparging are performed simultaneously. The centrifugal force of the mechanical degasser multiplies the force acting on the entrained gas bubbles and the oxygen bubbles to increase buoyancy and release of both the entrained gas bubbles and the oxygen bubbles. The increase in buoyancy of the bubbles accelerates the bubble-rise velocity. As the entrained gas bubbles and the oxygen bubbles rise toward the surface, they escape the well fluid. Additionally, the oxygen injected into the well fluid may react with hydrogen sulfide dissolved in the fluid, thereby producing elemental sulfur, which may be more easily separated from the fluid. When the well fluid rises to the level of the weir 710 due to the input flow of well fluid and aeration of the tank, the well fluid pours over the weir and empties into another containment. The outfall well fluid 711 may then be safely disposed.

The aeration and degassing system may be continuously operated for a period of time. In one embodiment, the aeration and degassing system is continuously operated for approximately 8 to 10 hours at a time. After aeration and degassing may be stopped periodically during the process to remove elemental sulfur from the process tank that results from the reaction between oxygen sparged into the well fluid and entrained hydrogen sulfide.

EXAMPLES

Example 1

Figure 8:
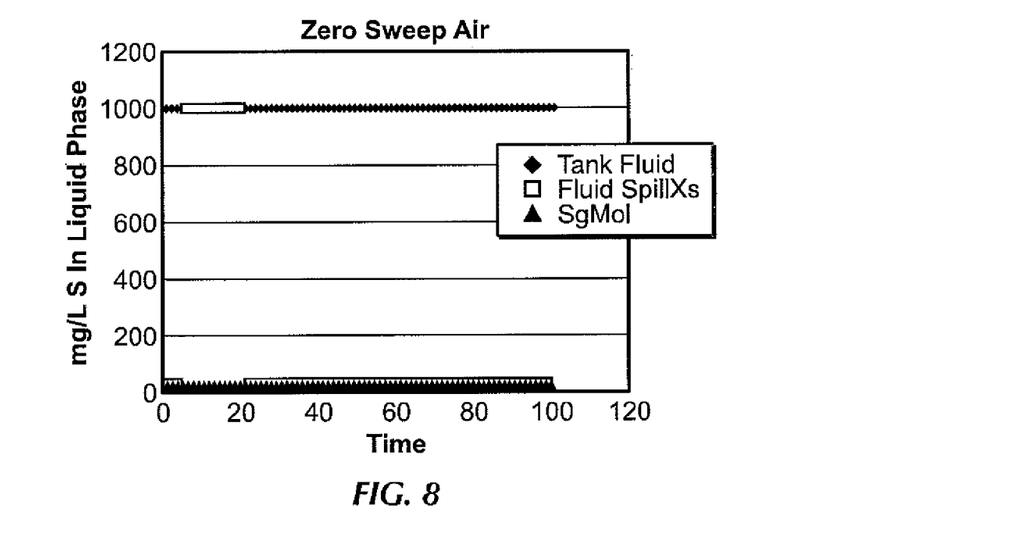
FIG. 8 shows a chart of amount of hydrogen sulfide with respect to time of in accordance with an embodiment of the invention.

As a first example, consider the case where no sparging occurs. Assume a total of 20 m³ of well fluid having a pH of 2.0 to be treated and a feed rate of the well fluid is 800 L/min. Initially, the well fluid flows into a process tank having a volume of 8,000 L. Once 6 m³ of well fluid has poured into the process tank, the well fluid will begin to spill over the weir. The well fluid in the process tank and the well fluid that spills over the weir retain 1,000 mg/L dissolved sulfides. Accordingly, no sulfur is removed from the well fluid. FIG. 8 shows the relationship between well fluid in the process tank, the well fluid that spills over the weir, and the motes of sulfur gas.

Example 2

Figure 9:
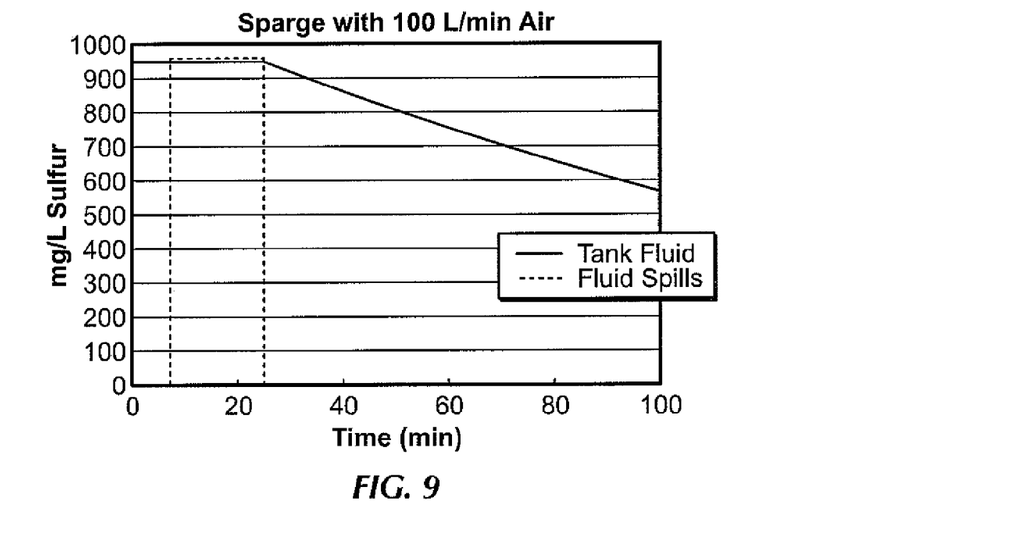
FIG. 9 shows a chart of amount of hydrogen sulfide reduced with respect to time in accordance with an embodiment of the invention.

In another example, 6,000 L well fluid with a pH of 2.0 contained in a 8,000 L process tank is sparged with "zero air," that is, air that contains no oxygen, at a rate of 100 L/min. Sparging the well fluid with zero air at 100 L/min results in modest hydrogen sulfide stripping. As shown in FIG. 9, spent well fluid in the process tank is continuously stripped of hydrogen sulfide, but even after 100 minutes only a level of about 580 mg/L sulfur is reached for the 6 m³ of well fluid retained in the unit.

Example 3

Figure 10:
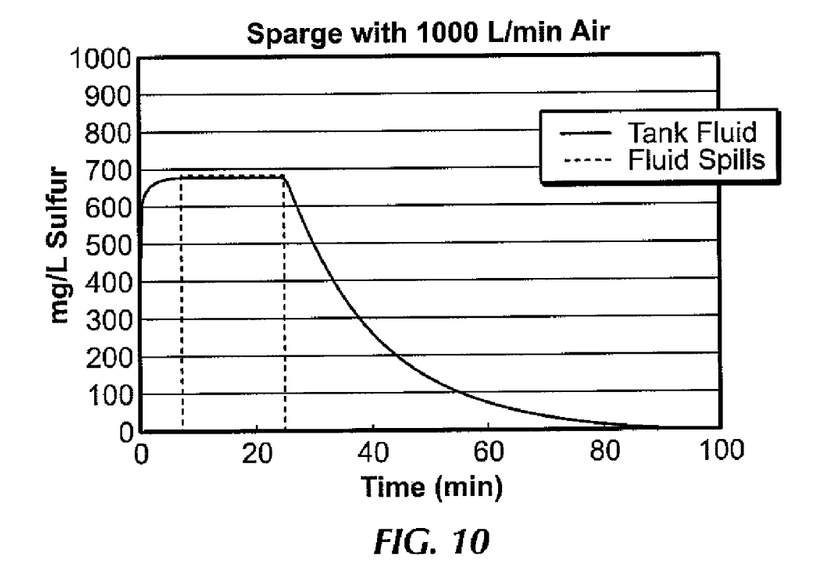
FIG. 10 shows a chart of amount of hydrogen sulfide reduced with respect to time in accordance with an embodiment of the invention.

In another example, 6,000 L of well fluid with a pH of 2.0 contained in a 8,000 L process tank is sparged with zero air at a rate of 1,000 L/min. The amount of sulfur reduced over time as a result of the sparging is shown in FIG. 10 for both the well fluid in the process tank and the well fluid that spills over the weir. Sparging the well fluid with zero air at 1,000 L/min results in larger reduction in sulfur content than sparging the well fluid with zero air at 100 L/min.

Example 4

Figure 11:
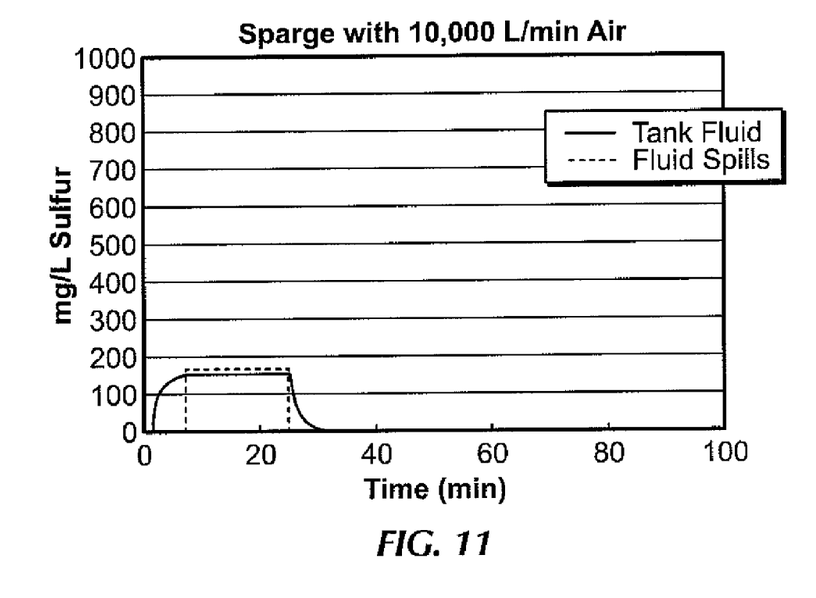
FIG. 11 shows a chart of amount of hydrogen sulfide reduced with respect to time in accordance with an embodiment of the invention.

In another example, 6,000 L of well fluid with a pH of 2.0 contained in a 8,000 L process tank is sparged with zero air at a rate of 10,000 L/min. Sparging the well fluid with zero air at 10,000 L/min results in significant and immediate reduction in sulfides, as shown in FIG. 11 for both the well fluid in the process tank and the well fluid that spills over the weir.

Example 5

Figure 12:
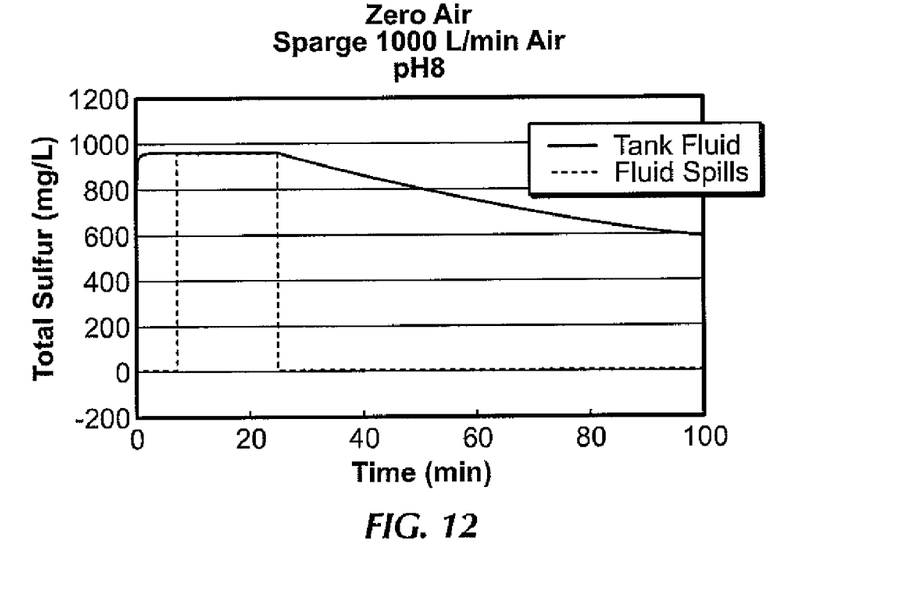
FIG. 12 shows a chart of amount of hydrogen sulfide reduced with respect to time in accordance with an embodiment of the invention.

If the pH is raised to a pH value of 8 in the sparging system described in Example 4 above, the extraction of hydrogen sulfide is less efficient. FIG. 12 shows the result of a system where the pH is 8 and zero air is sparged through the well fluid at a rate of 1,000 L/min for both the well fluid in the process tank and the well fluid that spills over the weir. A comparison between FIG. 12 (pH 8) and FIG. 10 (pH 2) shows the extraction of hydrogen sulfide in the higher pH well fluid is much less efficient than in the well fluid with a lower pH.

Example 6

Figure 13:
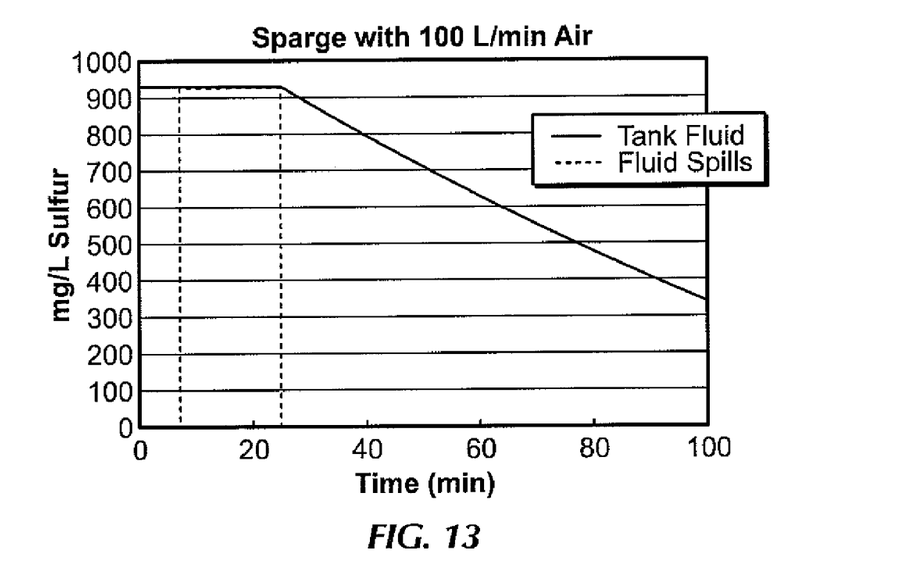
FIG. 13 shows a chart of amount of hydrogen sulfide reduced with respect to time in accordance with an embodiment of the invention.

If the well fluid in the process tank of Example 2 is sparged with oxygen instead of zero air, at the same rate of 100 L/min, the instantaneous stripping of hydrogen sulfide does not drastically improve. However, the final amount of sulfur concentration present in the well fluid is reduced. See FIG. 13.

Example 7

Figure 14:
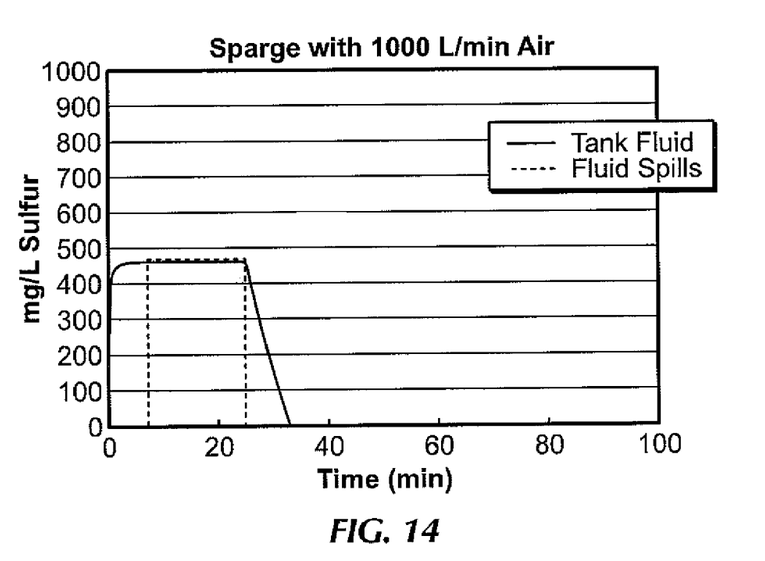
FIG. 14 shows a chart of amount of hydrogen sulfide reduced with respect to time in accordance with an embodiment of the invention.

If the well fluid in the process tank of Example 3 is sparged with oxygen, instead of zero air, at the same rate of 1,000 L/min, the sulfur concentration present in the well fluid is significantly reduced. As shown in FIG. 14, the reactions are complete in less than 40 minutes.

Example 8

Figure 15:
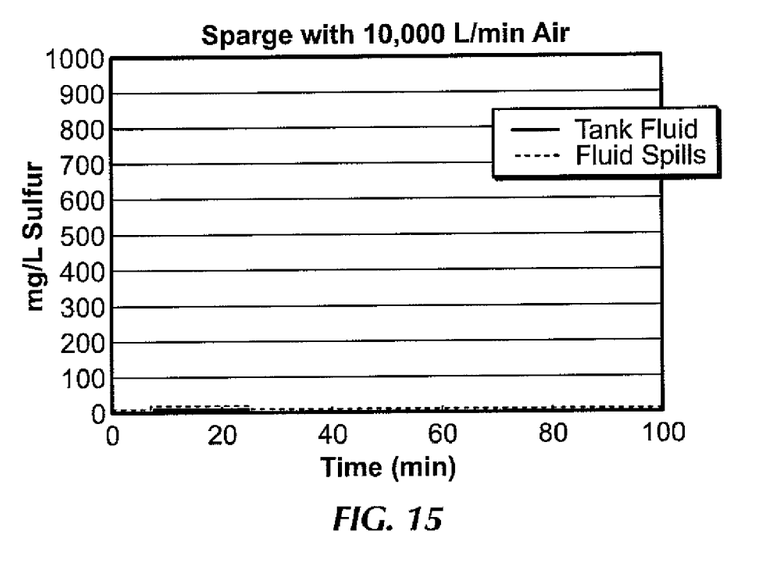
FIG. 15 shows a chart of amount of hydrogen sulfide reduced with respect to time in accordance with an embodiment of the invention.

If the well fluid in the process tank of Example 5 is sparged with oxygen, instead of zero air, at the same rate of 10,000 L/min, sulfur present in the well fluid is destroyed and extracted in real time, as shown in FIG. 15. This example assumes perfect mass-transport across the gas/liquid interface.

Advantageously, embodiments of the present invention provide a system and method for reducing the amount of hydrogen sulfide in a well fluid. Further, embodiments of the present invention may reduce the risks to both the structure of the well and personnel associated with circulating well fluid, including embrittled tubulars, corrosion of equipment, and death.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system for reducing entrained and dissolved gases from a well fluid comprising:
   a well fluid;
   at least one process tank into which the well fluid flows, wherein a first process tank comprises a weir arrangement over which the well fluid spills;
   a mechanical degasser coupled to the at least one process tank and configured to receive the well fluid; and
   an aeration device disposed in the at least one process tank that generates bubbles in the well fluid,
   wherein the aeration device is disposed proximate an intake of the mechanical degasser.

2. The system of claim 1, wherein the bubbles in the well fluid comprise gas injected from the aeration device.

3. The system of claim 2, wherein the gas injected comprises oxygen.

4. The system of claim 1, wherein the mechanical degasser is configured to exert a centrifugal force.

5. The system of claim 1, further comprising a pH measurement device.

6. The system of claim 1, further comprising a well fluid measurement device, wherein the device measures the volume of the well fluid.

7. The system of claim 1, further comprising a flare.

8. The system of claim 1, wherein the aeration device comprises a hose with at least one perforation.

9. The system of claim 8, wherein the hose comprises one selected from the group consisting of elastomer, flits, glass, metal, plastic, and any combination thereof.

10. A method of reducing entrained and dissolved gases from a well fluid comprising:
    flowing a well fluid into a process tank;
    exerting a centrifugal force on the well fluid;
    generating bubbles from an inlet into the well fluid in the process tank; and disposing an intake of a mechanical degasser proximate the inlet into the well fluid.

11. The method of claim 10, further comprising determining the pH of the well fluid in the process tank.

12. The method of claim 11, further comprising maintaining the pH of the well fluid in the process tank below a predetermined value.

13. The method of claim 12, wherein maintaining the pH of the well fluid comprises supplying an acid to the well fluid in the process tank.

14. The method of claim 13, wherein the acid is citric acid.

15. The method of claim 10, further comprising flaring the gas, wherein the flared gases are separated from the well fluid.

16. The method of claim 10, wherein generating bubbles in the well fluid comprises injecting gas into the well fluid.

17. The method of claim 16, wherein the gas injected in the well fluid comprises oxygen.

18. The method of claim 10, wherein the exerting a centrifugal force on the well fluid is performed after the well fluid reaches a predetermined volume of the process tank.

19. The method of claim 10, further comprising spilling the well fluid in the process tank over a weir.

20. The method of claim 10, wherein the generating bubbles comprises injecting air through a hose comprising at least one perforation.

21. The method of claim 20, wherein the hose comprises one selected from the group consisting of elastomer, flits, glass, metal, plastic, and any combination thereof.

22. The method of claim 10, wherein the exerting a centrifugal force on the well fluid and the injecting the air into the well fluid are performed simultaneously.

23. A system for reducing entrained and dissolved gases from a well fluid comprising:
    a well fluid;
    at least one process tank into which the well fluid flows, wherein a first process tank comprises a weir arrangement over which the well fluid spills;
    a mechanical degasser coupled to the at least one process tank and configured to receive the well fluid; and
    means for generating bubbles in the well fluid,
    wherein the means for generating bubbles is disposed proximate an intake of the mechanical degasser.

* * * * *